(12) United States Patent
Caliskan

(10) Patent No.: US 8,177,024 B2
(45) Date of Patent: May 15, 2012

(54) ACCOUSTIC ATTENUATION DEVICE FOR AN INTAKE LINE OF A COMBUSTION ENGINE AND INTAKE LINE INCORPORATING SAME

(75) Inventor: Alper Caliskan, St Jean de la Ruelle (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 12/879,405

(22) Filed: Sep. 10, 2010

(65) Prior Publication Data

US 2011/0061970 A1    Mar. 17, 2011

(30) Foreign Application Priority Data

Sep. 11, 2009    (FR) ...................................... 09 04336

(51) Int. Cl.
*F01N 1/02*    (2006.01)
(52) U.S. Cl. ................ 181/250; 123/184.53; 123/184.57
(58) Field of Classification Search .................. 181/229, 181/250; 123/184.53, 184.54, 184.55, 184.56, 123/184.57
See application file for complete search history.

(56) References Cited

U.S. PATENT DOCUMENTS

| | | | | |
|---|---|---|---|---|
| 3,323,613 | A * | 6/1967 | Hanchett ........................ | 181/250 |
| 4,969,536 | A * | 11/1990 | Allen .............................. | 181/229 |
| 5,540,553 | A * | 7/1996 | Goto et al. ................. | 416/241 A |
| 5,635,687 | A * | 6/1997 | Biscaldi ......................... | 181/272 |
| 7,448,469 | B2 * | 11/2008 | Seyler et al. .................... | 181/249 |
| 7,556,123 | B2 * | 7/2009 | Ido et al. ......................... | 181/255 |
| 7,779,822 | B2 * | 8/2010 | Prior et al. ................... | 123/559.1 |
| 2004/0250785 | A1 * | 12/2004 | Oba et al. ................. | 123/184.57 |
| 2010/0139604 | A1 * | 6/2010 | Abdolhosseini et al. | 123/184.56 |
| 2010/0193282 | A1 * | 8/2010 | Kim et al. ...................... | 181/229 |
| 2011/0074067 | A1 * | 3/2011 | Khami et al. ................. | 264/513 |

FOREIGN PATENT DOCUMENTS

| | | |
|---|---|---|
| DE | 199 56 172 A1 | 5/2001 |
| EP | 1 128 071 A2 | 8/2001 |
| EP | 1 352 172 B1 | 10/2003 |
| EP | 1 795 733 A1 | 6/2007 |
| FR | 2 895 030 A1 | 6/2007 |
| JP | 8-90641 A | 4/1996 |
| JP | 2000-240520 A | 9/2000 |
| JP | 2007-016652 A | 1/2007 |

OTHER PUBLICATIONS

Search Report for Application No. FR 0904336 dated Mar. 4, 2010.

* cited by examiner

*Primary Examiner* — Forrest M Phillips
(74) *Attorney, Agent, or Firm* — Alston & Bird LLP

(57) ABSTRACT

The present invention relates to an acoustic attenuation device for an intake line of an internal combustion engine and to an intake line such as this incorporating same. An acoustic attenuation device according to the invention is intended to have a flow of pressurized gaseous fluid passing through it and comprises:

a conduit structure which has a tubular wall ending in two ends, these respectively being the fluid inlet and fluid outlet ends, which are able to be incorporated into the intake line, and at least one resonance chamber which is arranged on the outside of this structure and which communicates therewith via at least one opening formed in said wall, the or each chamber being axially delimited by two transverse partitions. According to the invention, the or each chamber further comprises at least one gravity discharge orifice for discharging condensate which is formed in said wall in the vicinity of one of the transverse partitions, the or each chamber being delimited by two longitudinal walls which are joined together by these transverse partitions thereby forming a housing which is closed by a cover formed as one piece with this housing.

11 Claims, 2 Drawing Sheets

ACCOUSTIC ATTENUATION DEVICE FOR AN INTAKE LINE OF A COMBUSTION ENGINE AND INTAKE LINE INCORPORATING SAME

FIELD OF THE INVENTION

The present invention relates to an acoustic attenuation device for an intake line of an internal combustion engine such as a turbocharged engine for a motor vehicle and to an intake line such as this incorporating same. The invention applies to such a resonant chamber(s) attenuation device of the Helmholtz type.

BACKGROUND OF THE INVENTION

In the known way, acoustic attenuation devices for turbocharged motor vehicle engine intake lines comprise a tract through which pressurized air laden with oil is intended to travel and the air inlet and outlet ends of which are incorporated into this intake line. There are essentially two distinct types of device such as this, these including:

those with a radially external tubular casing to the end portions of which a radially internal tract structure is secured to form two annular resonance chambers with two respective widenings of the casing, for example like that described in document DE-A1-199 56 172, and those with Helmholtz resonators which are arranged radially on the outside of an air circulation tract being separated from one another by partitions that are transverse and/or longitudinal with respect to the tract and which communicate therewith through openings formed in its wall, as illustrated in document EP-B-1 352 172 for example.

One major disadvantage of the known attenuation devices of the type having annular resonance chambers lies in their relatively large size and in the low number of resonance chambers formed, which is generally limited to two, thus penalizing the acoustic performance for a given length of device.

As for known attenuation devices of the Helmholtz resonator type, these have the notable disadvantage of providing, over a greater or shorter length of time, an acoustic attenuation that is unsatisfactory both in respect of the hissing noises generated by the turbocharged engine (manifesting themselves in the form of pressure pulses in the low frequencies typically ranging from 1300 to 2000 Hz approximately) and in terms of the whistling noises also generated by this engine (high frequencies above around 2500 Hz).

These Helmholtz resonator devices also sometimes have the disadvantage of requiring several plastic components to be welded together, for example of requiring a cover to be welded to the wall of the resonance chamber(s), to the detriment of the method of manufacture of the device in terms of cleanliness, ease of implementation and cost, and also being potentially detrimental to the ability of the device to withstand pressure and the acoustic performance of the device, particularly on account of difficulties with controlling the geometric tolerances and/or the deformations of the welded plastic under the effect of temperature, this potentially giving rise to air leaks.

SUMMARY OF THE INVENTION

It is one object of the present invention to provide an acoustic attenuation device for an intake line of an internal combustion engine, such as a turbocharged engine for a motor vehicle, which provides a solution to all of these disadvantages, this device being intended to have a flow of pressurized gaseous fluid passing through it and comprising:

a conduit structure which has a tubular wall ending in two ends, these respectively being the fluid inlet and fluid outlet ends, which are able to be incorporated into said intake line, and at least one resonance chamber forming a Helmholtz resonator which is arranged on the outside of this conduit structure and which communicates therewith via at least one opening formed in said wall for the passage of said fluid, the or each chamber being axially delimited by two partitions substantially transverse to the axial direction of this structure.

To this end, a device according to the invention is such that the or each resonance chamber further comprises at least one gravity discharge orifice for discharging condensate carried along by the fluid, such as oil, which orifice is formed in said wall in the immediate vicinity of one of said transverse partitions, the or each chamber being transversely delimited by two longitudinal walls which run parallel to the axial direction of the structure and are joined together by these transverse partitions thereby forming a housing which is closed off in a fluidtight manner by a cover formed as one piece with this housing.

It will be noted that the or each condensate discharge orifice provided in a Helmholtz resonator according to the invention notably makes it possible to avoid the buildup, in the or each resonator, of hot oil and dust carried along by the fluid coming from the engine and condensing out upon contact with the walls, which buildup over the long term forms a pasty solid deposit that reduces the working volume of the corresponding chamber and thus disrupts the acoustic attenuation. In other words, this gravity discharge of condensate that the attenuation device according to the invention affords thus allows the acoustic performance of the or each Helmholtz resonator that it comprises to be a lasting performance.

It will also be noted that the or each discharge orifice arranged according to the invention also advantageously influences this acoustic attenuation by shifting the frequency band which, on the acoustic attenuation curve, corresponds to an acoustic attenuation band with a level equal to or higher than a given threshold (typically 20 dB), toward the high frequencies.

It will also be noted that this forming of the cover as one piece with the transverse and longitudinal partitions of the or each resonance chamber overcomes the aforementioned disadvantage of the prior art relating to the welding together of plastic components, thus avoiding the device becoming contaminated during the welding operation and making this device perfectly airtight in the region of the cover. In addition, this one-piece structure means that the method of manufacture of the device according to the invention can be simplified thus reducing its cost of production.

According to another feature of the invention, the housing and the cover may be formed as one piece with a radially external duct of the conduit structure thereby forming a one-piece assembly made of a plastic preferably by injection molding or blow molding, at least one anti-creep metal ring which is provided with said or each passage opening and with said or each discharge orifice being able to be inserted against the radially internal face of this duct to allow it to withstand high operating temperatures, such that the fluid flowing along the inside of the or each ring communicates directly with the or each chamber opposite.

Advantageously, the anti-creep ring(s) can be forcibly inserted against the radially internal face of the duct over substantially the entire axial length of this duct. In other words, if use is made of one single anti-creep ring, this ring may extend over practically the entire axial length of the device, whereas in an alternative form of the invention involving two coaxial anti-creep rings set end to end, the opposite ends of these two rings may substantially coincide with those of the device.

According to another feature of the invention, said or each discharge orifice may be formed in a corner of the corresponding chamber which corner is intended to form the lowermost point of the chamber when said chamber is mounted in said intake line (i.e. the lowermost region during operation of said wall that forms the bottom of the chamber).

It will thus be appreciated that the or each chamber could, for example, have not one but two identical discharge orifices formed axially on opposite sides to one another on said wall and one or other of which would allow for condensate discharge according to how it is positioned as a result of the orientation of the conduit structure once it has been incorporated into the intake line.

It will be noted that the attenuation device according to the invention does in particular make it possible to generate reduced pressure drops for the fluid flowing therein, and this plays a part in improving engine performance by comparison with the known attenuation devices with two annular resonance chambers which generate higher pressure drops.

According to another feature of the invention, said or each chamber may preferably be arranged radially on the outside of and axially on the inside of said conduit structure. More preferably still, said or each resonance chamber may be substantially in the shape of a rectangular parallelepiped truncated by said wall.

Advantageously, said or each discharge orifice may have a bore section which is smaller than that of said or each passage opening for the fluid and which is preferably of substantially circular shape.

According to another feature of the invention, said or each passage opening for the fluid then preferably has the shape of an oblong slot formed into an arc of a circle which runs transversally to this axial direction, substantially from one of these longitudinal walls to the other.

Said or each chamber may for example comprise two parallel passage openings which are formed in an axially middle region of this chamber, and one single discharge orifice which is preferably distant from the nearest opening by an axial distance that is greater than the distance separating the two openings from one another.

According to another feature of the invention, this attenuation device may comprise at least one row of said resonance chambers which follow on from one another in the axial direction of said conduit structure, it being possible for the two end chambers of the or each row to be respectively axially delimited by two transverse end partitions which connect these two longitudinal walls together thereby forming therewith said housing surmounted by said cover.

It will be noted that the attenuation device according to the invention may thus advantageously comprise a high number of Helmholtz resonators for a relatively small size, notably by comparison with the known attenuation devices with annular resonance chambers, while at the same time being adaptable to suit any surroundings so that it can be mounted in an intake line.

An intake line according to the invention for an internal combustion engine, such as a turbocharged motor vehicle engine, comprises at least one acoustic attenuation device according to the invention as described hereinabove, in which said or each discharge orifice is formed in a lower corner of the corresponding resonance chamber to allow said condensate to be discharged under gravity through this orifice.

As previously mentioned, one preferred use according to the invention of this acoustic attenuation device consists in attenuating the hissing and/or whistling noises of an internal combustion engine, such as a turbocharged motor vehicle engine.

These hissing noises attenuated by the device of the invention relate in particular to a frequency range from 1300 to 2000 Hz. As for the whistling noises, these refer in particular to a frequency band varying from about 2500 to 3500 Hz.

BRIEF DESCRIPTION OF THE DRAWINGS

Further advantages, features and details of the invention will become apparent from the remainder of the description which follows, with reference to some attached drawings, given solely by way of example, and in which.

DETAILED DESCRIPTION

Figure 1:
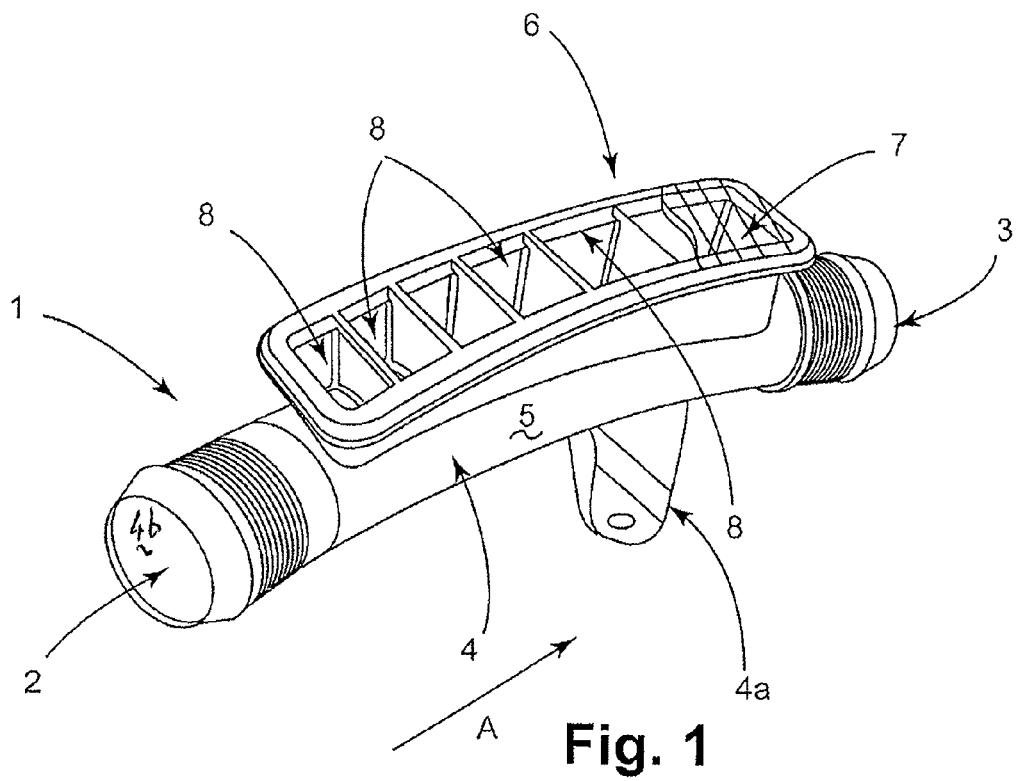
FIG. 1 is a perspective side view with cut away of an acoustic attenuation device according to one embodiment of the invention.
Figure 2:
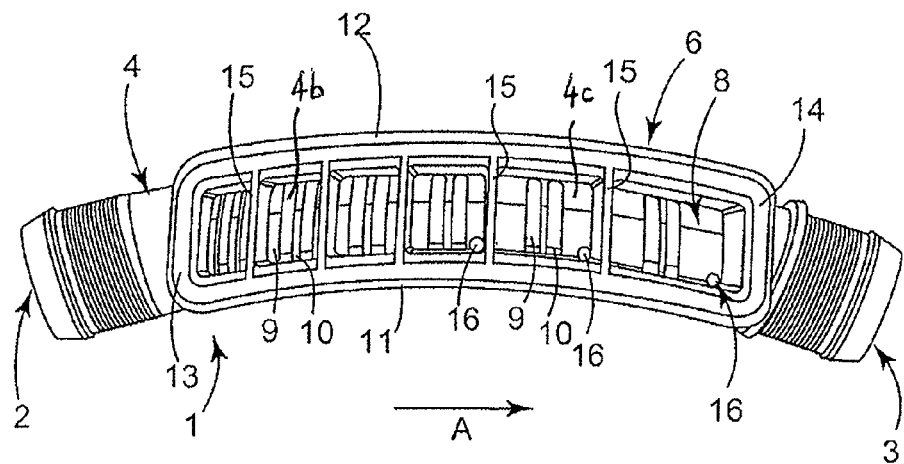
FIG. 2 is a perspective view from above showing the inside of the resonance chambers of the device of FIG. 1 (i.e. without the cover that surmounts these chambers)

The acoustic attenuation device 1 illustrated in FIGS. 1 and 2 is intended to be incorporated into an air intake line of a turbocharged motor vehicle engine, via its two respective connecting ends 2 and 3 for the inlet and outlet of pressurized air. This device 1 essentially comprises:

a one-piece plastic assembly, for example blow molded or injection molded, comprising a plastic conduit or duct 4 which has a tubular wall 5 of cylindrical overall shape ending in these two connecting ends 2 and 3 and which is provided with an attachment mount 4a, this conduit being extended as a single piece by a housing 6 which is closed by a cover 7 and contains several resonance chambers 8—six in this example—forming that same number of Helmholtz resonators following on from one another in the axial direction A of the conduit 4, and two metal anti-creep rings 4b and 4c which are forcibly inserted against the radially internal face of the conduit 4 being positioned therein coaxially and end to end so that the opposite axially external ends of these rings 4b and 4c coincide with these two ends 2 and 3 of the device 1 (only one ring 4b is partially visible in FIG. 1, the other being partially visible in FIG. 2).

As can be seen in FIG. 2, the housing 6 is formed as a single piece with the conduit 4 and radially surmounting it toward the outside, and the resonance chambers 8 that it delimits each communicate with the inside of the conduit 4 via slots 9 and 10 formed through the wall of each ring 4b, 4c. This housing 6 has a substantially rectangular cross section and is delimited by two longitudinal walls 11 and (which run parallel to the axial direction A of the conduit 4) joined together by two transverse end walls or partitions 13 and 14 and, in this example, by several intermediate partitions 15. Thus, each chamber 8 is substantially in the shape of a rectangular parallelepiped truncated by the wall of the corresponding ring 4b, 4c that forms its bottom and surmounted by the cover 7 and is delimited by the two longitudinal walls 11 and 12 and by two transverse partitions 13, 14, 15 (which run perpendicular to this axial direction A).

Each chamber 8 has, for example, a pair of parallel oblong slots 9 and 10 for the passage of air which are formed transversally on its bottom by the ring 4b, 4c in an axially middle region of this chamber 8. Each transverse slot 9, 10 preferably is in the shape of an arc of a circle running substantially from one of the longitudinal walls 11 to the other 12.

According to the invention, each chamber 8 not only forms a one-piece assembly (inclusive of cover 7) with the duct 4 but also comprises at its bottom, in addition to the slots 9 and 10 that allow air from the duct 4 to circulate, at least one orifice 16 through which condensed oil and dust with which the air is laden and which during operation become lodged in each chamber 8 can be discharged under gravity. More specifically, this orifice 16 is formed in the ring 4b, 4c in the immediate vicinity of one end of that one of the two transverse partitions 14, 15 delimiting the chamber 8 that is intended to form the lowermost point of this chamber in the configuration in which it is mounted in the air intake line (i.e. in that corner of the chamber 8 that will be lowermost during operation).

As can be seen in FIG. 2, the discharge orifice 16 of each chamber 8 preferably has a circular shape and a bore section that is very small by comparison with that of each slot 9, 10, and this orifice 16 is advantageously distant from the closest slot 10 by an axial distance that is greater than the distance separating the two slots 9 and 10 from one another.

As indicated previously, these discharge orifices 16 make it possible, on the one hand, to avoid the formation in each resonator 8 of a solid deposit of oil and dust that would reduce its working volume, thus making the acoustic performance obtained lasting performance and, on the other hand, to influence the acoustic attenuation by shifting the band corresponding to an acoustic attenuation range with a level equal to or greater than 20 dB typically toward the high frequencies.

Figure 3:
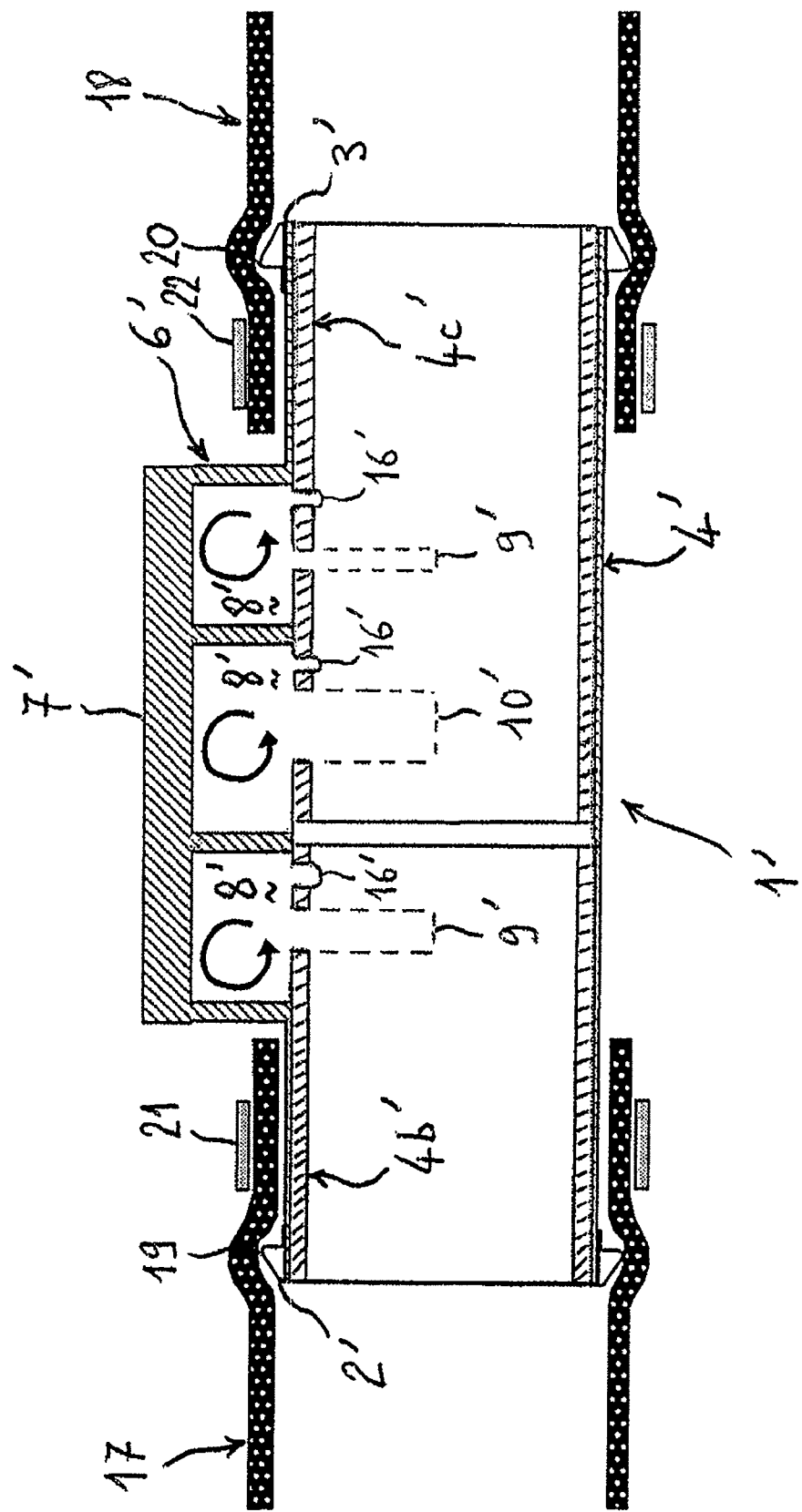
FIG. 3 is a schematic view in axial cross section of an acoustic attenuation device according to another example of the invention, in a position for connection to the air intake line of the engine.

The acoustic attenuation device 1' of FIG. 3 has two anti-creep rings 4b' and 4c' analogous to those of FIGS. 1 and 2, it being recalled that a device according to the invention could comprise one anti-creep ring running along the entire length of the duct 4' made of plastic. This device 1' essentially differs from that of FIGS. 1 and 2 in that its housing 6' delimits not six but three resonance chambers 8', but is still formed as a single piece with the cover 7' that surmounts it and with the duct 4'. Just one slot or opening 9', 10' has been depicted in FIG. 3 solely by way of example, this slot or opening being formed through each ring 4b', 4c' in place of the two slots 9 and seen previously, and allowing the inside of each ring 4b', 4c' to be made to communicate with the chambers 8', it being specified that the discharge orifice for discharging the condensate 16' under gravity may be analogous to the orifice 16 in FIG. 2 or alternatively may have different geometry (for example be non-circular). For the sake of clarity in FIG. 3 a dotted line has been used to schematically depict the openings 9', 10' and the orifices 16' which are made in the two anti-creep rings 4b' and 4c'.

FIG. 3 also illustrates the connection of the device 1' according to the invention to the air intake line of the engine, via two rubber hoses 17 and 18 into which the two connecting ends 2' and 3' of the duct 4' are respectively pushed, each end 2' and 3' in this example forming a bulbous portion 19, 20 that radially deforms the hose 17, 18. Two hose clips 21 and 22 are fitted respectively around the hoses 17 and 18, axially upstream of the bulbous portions 19 and 20.

The invention claimed is:

1. Acoustic attenuation device for an intake line of an internal combustion engine, said device being intended to have a flow of pressurized gaseous fluid passing through it and comprising:
   a conduit structure which has a tubular wall ending in two ends, these respectively being the fluid inlet and fluid outlet ends, which are able to be incorporated into said intake line, and
   at least one resonance chamber forming a Helmholtz resonator which is arranged on the outside of this conduit structure and which communicates therewith via at least one opening formed in said wall for the passage of the fluid, the or each chamber being axially delimited by two partitions substantially transverse to the axial direction (A) of this structure, wherein the or each resonance chamber further comprises at least one gravity discharge orifice for discharging condensate carried along by the fluid, which orifice is formed in said wall in the immediate vicinity of one of said transverse partitions, the or each chamber being transversely delimited by two longitudinal walls which run parallel to the axial direction of the structure and are joined together by these transverse partitions thereby forming a housing which is closed off in a fluid tight manner by a cover formed as one piece with this housing
   and wherein said housing and said cover are formed as one piece with a radially external duct of said conduit structure thereby forming a one-piece assembly made of a plastic, at least one anti-creep metal ring, said anti-creep ring being a cylindrical tube having a tubular wall provided with said or each passage opening and with said or each discharge orifice being inserted against the radially internal face of this duct to allow it to withstand high operating temperatures, such that the fluid flowing along the inside of the or each ring communicates directly with the or each chamber opposite.

2. Device according to claim 1, characterized in that each anti-creep ring is forcibly inserted against the radially internal face of said duct over substantially the entire length of the duct.

3. Device according to claim 1, characterized in that said or each discharge orifice is formed in a corner of the corresponding chamber which corner is intended to form the lowermost point of the chamber when said chamber is mounted in said intake line.

4. Device according to claim 3, characterized in that said or each chamber is arranged radially on the outside of and axially on the inside of said conduit structure having substantially the shape of a rectangular parallelepiped truncated by said wall.

5. Device according to claim 1, characterized in that said or each discharge orifice has a bore section which is smaller than that of said or each passage opening for the fluid.

6. Device according to claim 1, characterized in that said or each passage opening for the fluid has the shape of an oblong slot formed into an arc of a circle which runs transversally to this axial direction, substantially from one of these longitudinal walls to the other.

7. Device according to claim 6, characterized in that said or each chamber comprises two parallel passage openings which are formed in an axially middle region of this chamber, and one single discharge orifice which is distant from the nearest opening by an axial distance that is greater than the distance separating these two openings from one another.

8. Device according to claim 1, characterized in that it comprises at least one row of said resonance chambers which follow on from one another in the axial direction of the conduit structure, the two end chambers of said or each row being respectively axially delimited by two transverse end partitions which connect these two longitudinal walls together thereby forming therewith said housing surmounted by said cover.

9. Intake line for an internal combustion engine, characterized in that the intake line comprises at least one acoustic attenuation device according to claim 1, in which said or each discharge orifice is formed in a lower corner of the corresponding resonance chamber to allow said condensate to be discharged by gravity through this orifice.

10. Method of attenuating noise produced by an internal combustion engine comprising the step of using the acoustic attenuation device according claim 1 to attenuate hissing and/or whistling noises of an internal combustion engine.

11. Method according to claim 10, wherein said engine is a turbocharged engine.

* * * * *